(12) United States Patent
    Kim et al.

(10) Patent No.: US 9,462,502 B2
(45) Date of Patent: Oct. 4, 2016

(54) LIMITING DATA USAGE OF A DEVICE CONNECTED TO THE INTERNET VIA TETHERING

(71) Applicant: EMPIRE TECHNOLOGY DEVELOPMENT LLC, Wilmington, DE (US)

(72) Inventors: Seungil Kim, Seoul (KR); Youngil Ko, Seoul (KR)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 17 days.

(21) Appl. No.: 13/825,096

(22) PCT Filed: Sep. 25, 2012

(86) PCT No.: PCT/US2012/057125
    § 371 (c)(1),
    (2) Date: Mar. 19, 2013

(87) PCT Pub. No.: WO2014/051552
    PCT Pub. Date: Apr. 3, 2014

(65) Prior Publication Data
    US 2014/0086146 A1    Mar. 27, 2014

(51) Int. Cl.
    *H04W 28/02*    (2009.01)
    *H04W 4/00*     (2009.01)
(52) U.S. Cl.
    CPC ............... *H04W 28/02* (2013.01); *H04W 4/00* (2013.01); *H04W 4/008* (2013.01)

(58) Field of Classification Search
    None
    See application file for complete search history.

(56) References Cited

U.S. PATENT DOCUMENTS

| | | | |
|---|---|---|---|
| 2005/0174945 A1* | 8/2005 | Carrion-Rodrigo | H04L 29/06 370/241 |
| 2007/0008925 A1 | 1/2007 | Dravida et al. | |
| 2008/0125067 A1* | 5/2008 | Bells et al. | 455/187.1 |
| 2009/0022152 A1* | 1/2009 | Henry et al. | 370/389 |
| 2011/0314121 A1* | 12/2011 | Navda et al. | 709/217 |
| 2012/0117271 A1* | 5/2012 | Kennedy | G06F 17/30575 709/248 |
| 2012/0215851 A1* | 8/2012 | Wu et al. | 709/205 |
| 2012/0218892 A1 | 8/2012 | Kotecha et al. | |
| 2013/0171964 A1* | 7/2013 | Bhatia et al. | 455/411 |
| 2013/0191335 A1* | 7/2013 | Tse et al. | 707/634 |

FOREIGN PATENT DOCUMENTS

WO    2009136983 A1    11/2009

OTHER PUBLICATIONS

Peeters, S., Flexpert to the rescue: Detecting the network connection type with Flex 4.5, Apr. 13, 2011.
Sandvine, Case study: Sandvine tethered device detection solution and service revenue enhancement, Case Study, Sandvine Intelligent Broadband Networks, pp. 1-7.

(Continued)

*Primary Examiner* — Mohammad Adhami
(74) *Attorney, Agent, or Firm* — Turk IP Law, LLC

(57) ABSTRACT

Technologies and implementations for selectively synchronizing data with a tethered device are generally disclosed.

13 Claims, 4 Drawing Sheets

(56) References Cited

OTHER PUBLICATIONS

OS X Daily, 10 tips to reduce iphone & ipad personal hotspot data usage, Mar. 7, 2012, pp. 1-5, accessed online on Mar. 28, 2012 via osxdaily.com/2012/03/28/tips-to-reduce-iphone-ipad-personal-hotspot-data-usage/OS X Daily, 2012.

United States Patent and Trademark Office, International search report and written opinion of the International searching authority for PCT/US2012/057125 mailed on Nov. 29, 2012.
International Preliminary Report on Patentability received for International Application No. PCT/US2012/057125, mailed on Apr. 9, 2015.

* cited by examiner

300 A computer program product

302 A signal bearing medium 304 at least one of machine-readable instructions, which, when executed by one or more processors, operatively enable a data communication manager to:

receive a request for data communication from a mobile device;
determine a type of network being utilized by the mobile device;
determine a type of data to be communicated by the received request for data communication;
manage data communication based, at least in part, on one of the determined type of network or the determined type of data;
prioritize data communication based, at least in part, on one of the determined type of network or the determined type of data;
adjust data communication to accommodate data communication bandwidth based, at least in part, on one of the determined type of network or the determined type of data;
determine a data limit associated with the mobile device; or
reject the received request for data communication based, at least in part, on one of the determined type of network or the determined type of data.

| 306 a computer-readable medium | 308 a recordable medium | 310 a communications medium |

FIG. 3

LIMITING DATA USAGE OF A DEVICE CONNECTED TO THE INTERNET VIA TETHERING

CROSS-REFERENCE TO RELATED APPLICATION

The present application is a U.S. national stage filing under 35 U.S.C. §371 of International Application No. PCT/US12/57125, filed on Sep. 25 2012.

BACKGROUND

Unless otherwise indicated herein, the approaches described in this section are not prior art to the claims in this application and are not admitted to be prior art by inclusion in this section.

Current computing devices may connect to the Internet via a variety of different networks. For example, a computing device may connect to the Internet via a Wireless Local Area Network (Wi-Fi), or a wired Local Area Network, a cellular data network. In some cases, a computing device may connect to the Internet via any of the above available networks. For example, a computing device may connect to the Internet via either a Wi-Fi network and/or a cellular data network. The type of network used may be determined by the device, the network availability, and/or the user. As will be appreciated, the Internet connection "type" (e.g., Wi-Fi, wired, cellular, or the like) may be dynamic. That is, the connection type may change. This may be particularly true for mobile devices (e.g., laptops, tablet computers, smart phones, or the like). Due to the dynamic nature of the Internet connection for some devices, it may be difficult to determine how to synchronize data between the connected device and a destination accessible via the Internet.

For example, cloud based services may allow automatic synchronization of data. A cloud based storage service provider, for example, may allow data (e.g., photographs, documents, or the like) to be automatically synchronized between a client device and the cloud storage devices. New photographs, documents, or the like, may be uploaded from the client device to the cloud storage provider devices via the Internet. Additionally, changes to existing data (e.g., additions, modifications, deletions, or the like) may be automatically synchronized from the client device to the cloud storage devices whenever an Internet connection is available.

As stated, a device's Internet connection may be dynamic. Accordingly, some cloud services allow for selective synchronization. For example, synchronization may be enabled based on the type of connection to the Internet. As a further example, synchronization may be enabled for Internet connections using Wi-Fi but disabled for Internet connection using a cellular data network (e.g., 3G, 4G, or the like).

SUMMARY

Detailed herein are various illustrative methods for selectively synchronizing data for tethered devices. Example methods may include receiving a request for data communication from the mobile device, determining a type of network being utilized by the mobile device, determining a type of data to be communicated by the received request for data communication, and managing data communication based, at least in part, on one of the determined type of network or the determined type of data.

The present disclosure also describes various example machine-readable non-transitory medium having stored therein instructions that, when executed, enable selective synchronization of tethered devices. Example machine-readable non-transitory medium may have stored therein instructions that, when executed by one or more processors, operatively enable a data communication manager to receive a request for data communication from a mobile device, determine a type of network being utilized by the mobile device, determining a type of data to be communicated by the received request for data communication, and manage data communication based, at least in part, on one of the determined type of network or the determined type of data.

The present disclosure additionally describes example devices for selectively synchronizing data. Example devices may include a processor, a data communication manager communicatively coupled to the processor, and a machine-readable non-transitory medium having stored therein instructions that, when executed by the processor, operatively enable the data communication manager to receive a request for data communication from a mobile device, determine a type of network being utilized by the mobile device, determining a type of data to be communicated by the received request for data communication, and manage data communication based, at least in part, on one of the determined type of network or the determined type of data.

The foregoing summary is illustrative only and not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure, and are therefore, not to be considered limiting of its scope. The disclosure will be described with additional specificity and detail through use of the accompanying drawings.

In the drawings:

FIG. 3 illustrates an example computer program product; and

DETAILED DESCRIPTION

Figure 1:
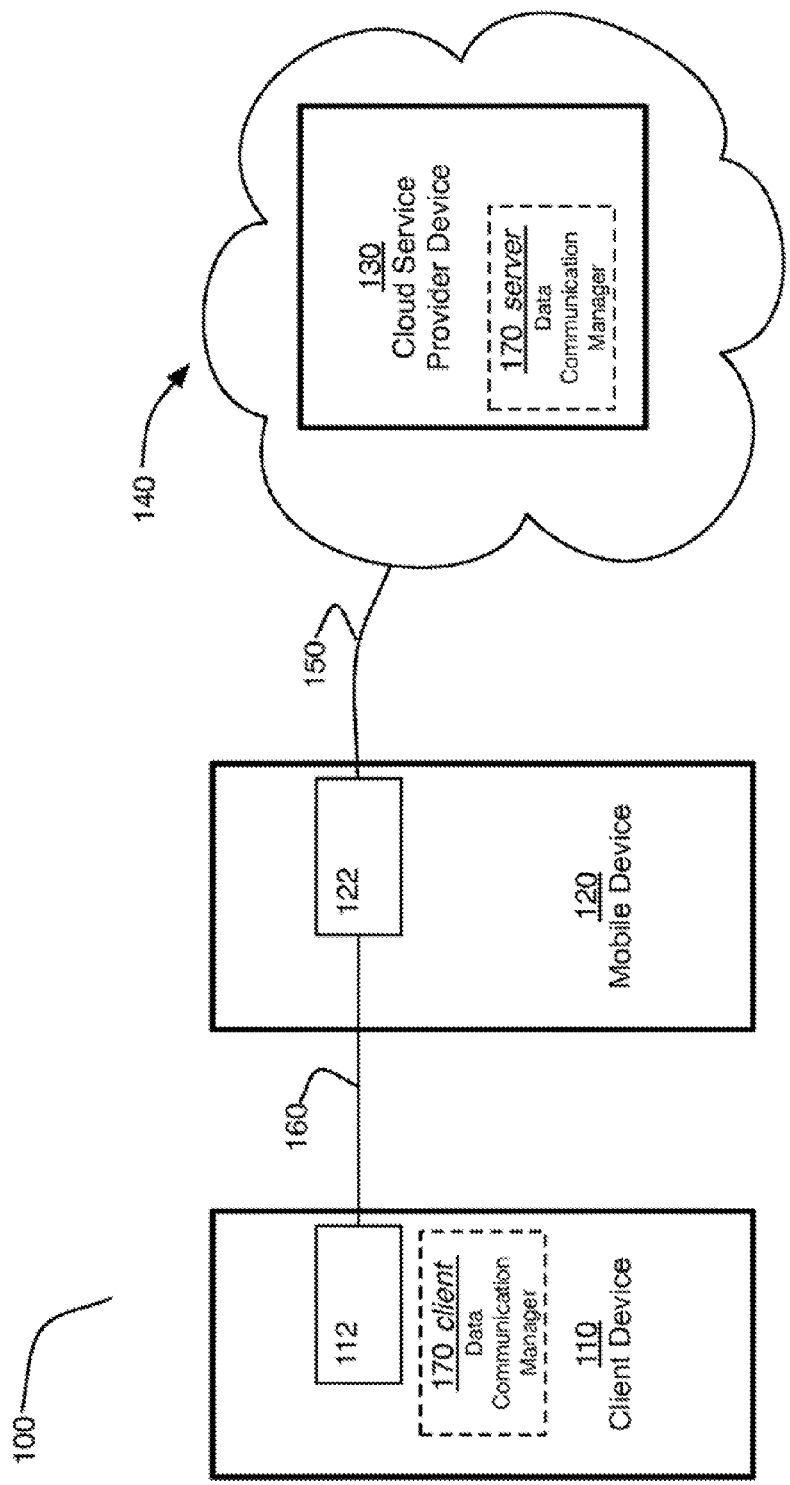
FIG. 1 illustrates a block diagram of an example system for selectively synchronizing data with a tethered device.

The following description sets forth various examples along with specific details to provide a thorough understanding of claimed subject matter. It will be understood by those skilled in the art that claimed subject matter may be practiced without some or more of the specific details disclosed herein. Further, in some circumstances, well-known methods, procedures, systems, components and/or circuits have not been described in detail, in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

This disclosure is drawn, inter alia, to methods, devices, systems and computer readable media related to selectively synchronizing data for tethered devices.

Conventional cloud based synchronization services may allow for selective synchronization. More particularly, synchronization may be enabled or disabled based on the type of connection to the Internet (e.g., Wi-Fi, cellular data, or the like). For example, synchronization of data (e.g., files, photographs, videos, or the like) between a client device and the cloud service provider may be enabled when the client device is connected to the Internet via a broadband Internet connection, such as a Wi-Fi connection, but disabled when connected to the Internet via a mobile broadband Internet connection, such as a cellular data connection. However, as can be appreciated, connection to the Internet may be facilitated using one technology (e.g., Wi-Fi, or the like), while the actual Internet connection occurs over another technology (e.g., cellular data, or the like). For example, as may be the case when tethering devices. Accordingly, synchronization may be enabled when the actual connection is such that synchronization might have been disabled.

The following non-limiting example is given to further highlight this issue and illustrate one or more embodiments of the present disclosure. In this example, a tablet computer having a Wi-Fi radio and a cellular data radio is described. The tablet computer may facilitate connecting to the Internet via either the Wi-Fi radio or the cellular data radio. For example, the Wi-Fi radio may connect to a Wi-Fi network and access the Internet over the Wi-Fi network. Alternatively, the cellular data radio may connect to a cellular data network and access the Internet over the cellular data network.

Data may be synchronized between the tablet computer and a cloud storage service provider. For example, digital files (e.g., documents, photos, videos, or the like) created or modified using the tablet computer may be automatically synchronized to the cloud storage service. That is, when the tablet computer connects to the Internet (e.g., via the Wi-Fi connection or via the cellular data connection) the digital files may be synchronized with the cloud storage service.

However, it may be advantageous to disable synchronization when connected to the Internet using, for example, the cellular data connection. As can be appreciated, if a number of photographs and videos were waiting to be synchronized, this may take a significant amount of time to synchronize over a cellular data connection. Furthermore, some cellular data connections charge based on the amount of data (e.g., kilobytes, megabytes, gigabytes, or the like) transmitted over the cellular data connection. As a result, it may be desirable to disable automatic synchronization when connected over the cellular data connection in order to limit the amount of data transmitted over that connection.

As stated above, conventional synchronization technologies allow selective synchronization based on the connection type. For example, if the tablet computer is connected to the Internet via a broadband Internet connection (e.g., using Wi-Fi, or the like) synchronization may be enabled. Conversely, if the tablet computer is connected to the Internet via a mobile broadband Internet connection (e.g., using cellular data, or the like) synchronization may be disabled.

In some implementations, the tablet computer may connect to another device and share that device's Internet connection. This type of arrangement is often referred to as "tethering". For example, a smart phone connected to the Internet via a cellular data connection may allow tethering via Wi-Fi. The tablet computer then may connect to the smart phone via Wi-Fi and share the smart phone's Internet connection. Using the above scenario, synchronization of data between the tablet computer and the cloud storage provider may be enabled due to the tablet computer using its Wi-Fi radio. However, the actual Internet connection is over the smart phones cellular data connection. As a result, the synchronization may be subject to cellular data speeds and may incur data charges as mentioned above.

Various embodiments of the present disclosure may allow selective synchronization based on the actual data connection (as opposed to the tethered data connection). For example, with some embodiments of the present disclosure, the tablet computer may disable synchronization when connected tethered to the smart phone and the smart phone's Internet connection is over a cellular data connection. In general, the tablet computer may determine the actual Internet connection type, and then enable or disable synchronization based on the determined actual connection type.

FIG. 1 illustrates a block diagram of a system 100 for selectively synchronizing data with a cloud service provider, arranged in accordance with at least some embodiments of the present disclosure. As can be seen from this figure, the system 100 may include a client device 110, a mobile device 120, and a cloud service provider device 130 accessible via Internet 140. The client device 110 and the mobile device 120 may also include network interface components 112 and 122, respectively.

The mobile device 120 may connect to the Internet 140 via a connection 150. The client device 110 may connect to the Internet 140 by tethering with the mobile device 120 via a connection 160. As indicated above, by tethering with the mobile device 120 via the connection 160, the client device 110 may share the connection 150 to the Internet 140. As used herein, the connection 150 may be referred to as the "actual connection" and the connection 160 may be referred to as the "tethered connection".

In general, the client device 110 may be any computing device (e.g., a desktop computer, a laptop computer, a tablet computer, a smart phone, or the like) configured to synchronize data with a cloud service provider. The mobile device 120 may be any device (e.g., a desktop computer, a laptop computer, a tablet computer, a smart phone, a mobile base station, a hotspot, or the like) configured to establish a connection to the Internet 140 and allow tethering with one or more other devices.

As shown, the client device 110 and the mobile device 120 may include network interface components 112 and 122, respectively. In general, the network interface components 112 and 122 may include logic and/or features configured to establish a connection (e.g., the connection 150, the connection 160, or the like) with another device, a network, the Internet, or the like. For example, the network interface component(s) 112 and/or 122 may facilitate connecting to a Local Area Network (LAN) (e.g., a wired network, a Wi-Fi network, or the like). Additionally, or alternatively, the network interface component(s) 112 and/or 122 may facilitate connecting to a cellular data network (e.g., 3G, 4G, or the like). Accordingly, the connection 150 (e.g., the actual connection) may correspond to a cellular network connection, a wired LAN connection, or a Wi-Fi LAN connection. Similarly, the connection 160 (e.g., the tethered connection) may correspond to a wired LAN connection or a Wi-Fi LAN connection.

It is to be appreciated that although other technologies for tethering exist (e.g., Bluetooth, USB, or the like) the above mentioned cases (e.g., wired and Wi-Fi) are used herein for clarity of presentation. However, with at least some embodiments of the present disclosure, the connection 160 may correspond to other technologies not mentioned herein. Furthermore, although not shown in FIG. 1, the client device 110 may be capable of establishing a connection to the Internet 140 without tethering with the mobile device 120. For example, the client device 110 may be capable of establishing an Internet connection via a cellular data network. However, as can be appreciated, due to limits on data usage, connection speeds, or the like, it may be advantageous to tether the client device 110 as shown in FIG. 1, as opposed to using an available connection directly to the Internet.

In general, the client device 110 may be configured to synchronize (e.g., upload, download, modify, delete, or the like) data between the client device 110 and the cloud service provider device 130. For example, if the cloud service provider device 130 corresponds to server(s) for a cloud storage provider, data (e.g., files, images, videos, or the like) may be synchronized between the client device 110 and the cloud service provider device 130. Image(s) created with the client device 110, for example, may be uploaded to the cloud service provider device 130 as part of the synchronization process.

As will be appreciated, various different types of data may be synchronized. For example, the cloud service provider device 130 may correspond to servers for a cloud storage provider as mentioned above. Accordingly, digital files may be stored on the cloud service provider device 130 and synchronized with the client device 110. The cloud service provider device 130 may also correspond to servers for a social network. Accordingly, data (e.g., status updates, posts, contacts, images, videos, or the like) may be stored on the cloud service provider device 130 and synchronized with the client device 110.

It is to be further appreciated, that although FIG. 1 only shows a single cloud service provider device 130, data may be synchronized across multiple devices, data centers, or the like. Additionally, although also not shown, the data may be synchronized from multiple client devices.

With some embodiments of the present disclosure, data synchronization may be facilitated by an application executing upon either the client device 110 or the cloud service provider device 130. For example, FIG. 1 shows data communication managers 170. As can be seen, the client device 110 may include the data communication manager 170 client. Similarly, the cloud service provider device 130 may include the data communication manager 170 server. Alternatively, with some embodiments, accessing a webpage or a web-application (e.g., Java application, Flash application, or the like) may facilitate data synchronization. For example, a specific webpage may be accessed from the client device 110, which may initiate data synchronization.

In some embodiments, as indicated above, data synchronization may be two-way. That is, data may be synchronized between both the client device 110 and the cloud service provider device 130. With some embodiments, data synchronization may be one-way. That is, data may be synchronized from the client device 110 to the cloud service provider device 130, or data may be synchronized from the cloud service provider device 130 to the client device 110.

As used herein, cloud service may include any service where computing resources or data storage resources for synchronizing data are provided over a network (e.g., a WAN, a LAN, the Internet, or the like). Similarly, cloud storage service may include any service where access to synchronized data is available over a network (e.g., a WAN, a LAN, the Internet, or the like). Companies and/or resources that facilitate cloud services and/or cloud storage services may be referred to as cloud service providers, cloud storage providers, and/or cloud storage service providers. For example, cloud storage providers (e.g., DROPBOX®, FLIKR®, CARBONITE®, GOOGLE DRIVE®, or the like) may be cloud service providers and have corresponding cloud service provider devices available to correspond to the cloud service provider device 130. Additionally, other systems and devices, such as, for example, proprietary system where data may be synchronized between client device(s) over a network (e.g., a WAN, a LAN, the Internet, or the like) may be considered cloud service providers for purposes of this disclosure.

With various embodiments of the present disclosure, synchronization may be enabled or disabled based on the actual connection (e.g., the connection 150) type as opposed to the tethered connection (e.g., the connection 160) type. For example, if the connection 150 is a Wi-Fi connection, data synchronization may be enabled. Alternatively and/or additionally, if the connection 150 is a cellular data connection, data synchronization may be disabled.

Figure 2:
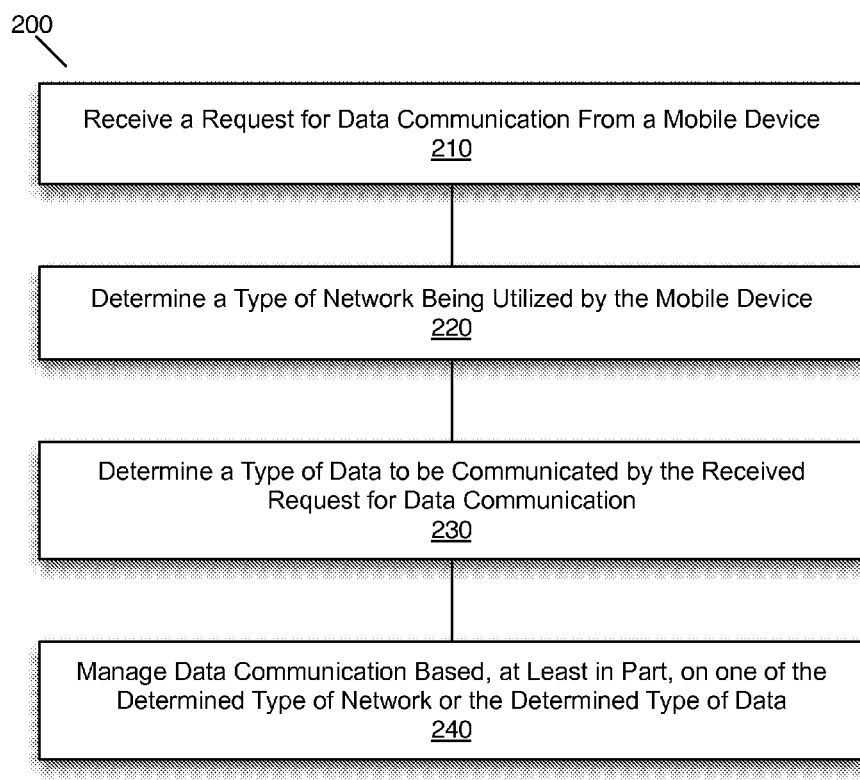
FIG. 2 illustrates a flow diagram of an example method for selectively synchronizing data with a tethered device.

FIG. 2 illustrates a flow chart of an example method 200 for selectively synchronizing data with a tethered device, arranged in accordance with some embodiments of the present disclosure. In some portions of the description, illustrative implementation of the method 200 is described with reference to elements of the system 100 depicted in FIG. 1. However, the described embodiments are not limited to this depiction. More specifically, some elements depicted in FIG. 1 may be omitted from example implementations of the methods detailed herein. Furthermore, other elements not depicted in FIG. 1 may be used to implement example methods.

Additionally, FIG. 2 employs a block diagram to illustrate the example method detailed therein. This block diagram may set out various functional blocks or actions that may be described as processing steps, functional operations, events and/or acts, etc., and may be performed by hardware, software, and/or firmware. Numerous alternatives to the functional blocks detailed may be practiced in various implementations. For example, intervening actions not shown in the figures and/or additional actions not shown in the figures may be employed and/or some of the actions shown in the figures may be eliminated. In some examples, the actions shown in one figure may be operated using techniques discussed with respect to another figure. Additionally, in some examples, the actions shown in these figures may be operated using parallel processing techniques. The above described, and others not described, rearrangements, substitutions, changes, modifications, etc., may be made without departing from the scope of claimed subject matter.

Beginning at block 210, "Receive a Request for Data Communication From a Mobile Device", the data communication manager 170 of the cloud service provider device 130 may include logic and/or features configured to receive a request for data communication from the mobile device 120. In general, at block 210, the cloud service provider device 130 may receive a request for data communication from the client device 110, routed through the mobile device 120. More specifically, as the client device 110 is tethered to the mobile device 120, the request for data communication will be routed through the mobile device 120. As such, although the request may originate at the client device 110, the request may be received from the mobile device 120. For example, the data communication manager 170 server may be configured to receive a request for data communication from the client device 110, routed through the mobile device 120.

Alternatively and/or additionally, at block 210, the client device 110 may include logic and/or features configured to receive a request for data communication from the mobile device 120. For example, the cloud service provider device 130 may send a request for data communication to the client device 110, which may be routed through the mobile device 120. As such, the client device 110 may receive the request from the mobile device 120. In some embodiments, the data communication manager 170 client may receive the request for data communication as detailed above.

With some embodiments, the request for communication may correspond to a request to synchronize data between the client device 110 and the cloud service provider device 130. For example, to synchronize digital files (e.g., a set of files, a location of files, or the like). With some embodiments, the request may correspond to a request to update data (e.g., status updates, posts, IM's, a pictures feed, or the like).

Continuing from block 210 to block 220, "Determine a Type of Network Being Utilized by the Mobile Device", the cloud service provider device 130 may include logic and/or features configured to determine the type of network being utilized by the connection 150. For example, in some embodiments, the data communication manager 170 server may be configured to determine the type (e.g., Wi-Fi, wired, cellular data, or the like) of network corresponding to the connection 150.

With some embodiments, the data communication manager 170 server may determine the network type from the Internet Protocol (IP) address associated with the connection 150. For example, referring to FIG. 1, the IP address associated with the client device 110 and the connection 160 may be considered a "private" IP address, as it is not necessarily exposed to the Internet. The IP address associated with the mobile device 120 and the connection 150 may be considered a "public" IP address as it is exposed to the Internet. Accordingly, the public IP address may be used to determine the network service provider (e.g., ISP, or the like) associated with the connection 150. As such, the IP address may be used to determine the type of network (e.g., wired/Wi-Fi or cellular data) corresponding to the public IP address and correspondingly the connection 150. For example, if the public IP address is within the range of IP address that correspond to a cellular data provider network, then it may be determined that the connection 150 corresponds to a cellular data network. However, if the public IP address is within the range of IP addresses that correspond to a non-cellular data provider network ISP's, then it may be determined that the connection 150 corresponds to a wired or Wi-Fi network type.

In some embodiments, the Service Set Identifier (SSID) associated with the mobile device 120 may be used to determine the network type corresponding to the connection 150. For example, if the SSID associated with the connection 160 and the mobile device 120 includes particular keywords it may be determined that the network of the connection 150 is of a particular type. As a further example, if the SSID associated with the connection 160 included specific keywords (e.g., iPhone, Android, Droid, Mobile, 3G, 4G, LTE, or the like) it may be determined that the network associated with the connection 150 was a cellular data network.

As mentioned, in some embodiments, at block 220, the data communication manager 170 server may determine a type of network utilized by the mobile device 120 and the connection 150. Alternatively and/or additionally, with some embodiments, at block 220, the client device 110 may include logic and/or features configured to determine a network the type being utilized by the mobile device 120 and the connection 150. For example, the data communication manager 170 client may determine a network type associated with the connection 150 based on the SSID of the connection 160 as described above. Alternatively, the data communication manager 170 client may determine a network type associated with the connection 150 based on the public IP address as described above.

Continuing from block 220 to block 230, "Determine a Type of Data to be Communicated by the Received Request for Data Communication", the cloud service provider device 130 may include logic and/or features configured to determine a type of data to be synchronized. In general, at block 230, the cloud service provider device 130 may determine one or more aspects about the data associated with the request for communication. For example, the data communication manager 170 server may be configured to determine one or more aspects about the data to be communicated.

For example, if the data is associated with a request to synchronize files between the client device 110 and the cloud storage provider device 130, one or more aspects (e.g., number of files, size of files, or the like) may be determined. As another example, if the data is associated with a video file, then one or more aspects (e.g., the size of the file, the bitrate of the file, or the like) may be determined.

As with blocks 210 and 220, in some embodiments, at block 230, the client device 110 may include logic and/or features configured to determine a type of data to be synchronized. For example, the data communication manager 170 client may be configured to determine one or more aspects about the data to be communicated at block 230.

Continuing from block 230 to block 240, "Manage Data Communication Based, at Least in Part, on one of the Determined Type of Network or the Determined Type of Data", the cloud service provider device 130 may include logic and/or features configured to manage the data communication. In general, at block 240, the data communication manager 170 server may manage (e.g., enable, disable, modify, or the like) the data communication. For example, the data communication may be enabled if it is determined that the connection 150 corresponds to a wired or Wi-Fi network type but disabled if it is determined that the connection 150 corresponds to a cellular data network type.

Alternatively and/or additionally, the data communication may be limited or restricted in some manner. For example, if the type of data is a video file, then the bitrate of audio and/or video compression may be modified (e.g., reduced, or the like). As another example, if the data request corresponded to a number of files to be synchronized, then the synchronization may be restricted (e.g., only specific files synchronized, only files less than a specific size synchronized, or the like).

With some embodiments, the data communication may be rejected. For example, if it is determined that the network is of a cellular data network type, then a data limit or bandwidth limit may be determined and used to reject or accept the request for data communication.

As with blocks 210, 220, and 230, in some embodiments, at block 240, the client device 110 may include logic and/or features configured to manage the data communication. For example, the data communication manager 170 client may be configured to manage the communication as detailed above.

In general, the method described with respect to FIG. 2 and elsewhere herein may be implemented as a computer program product, executable on any suitable computing system, or the like. For example, a computer program product for selectively synchronizing data a tethered device may be provided. Example computer program products are described with respect to FIG. 3 and elsewhere herein.

FIG. 3 illustrates an example computer program product 300, arranged in accordance with at least some embodiments of the present disclosure. The computer program product 300 may include machine-readable non-transitory medium having stored therein a plurality of instructions that, when executed, operatively enable a data communication manager according to the processes and methods discussed herein. The computer program product 300 may include a signal bearing medium 302. The signal bearing medium 302 may include one or more machine-readable instructions 304, which, when executed by one or more processors, may operatively enable a computing device to provide the functionality described herein. In various examples, the devices discussed herein may use some or all of the machine-readable instructions.

In some examples, the machine-readable instructions 304 may include receiving a request for data communication from a mobile device. In some examples, the machine-readable instructions 304 may include determining a type of network being utilized by the mobile device. In some examples, the machine-readable instructions 304 may include determining a type of data to be communicated by the received request for data communication. In some examples, the machine-readable instructions 304 may include managing data communication based, at least in part, on one of the determined type of network or the determined type of data. In some examples, the machine readable instructions 304 may include prioritizing data communication based, at least in part, on one of the determined type of network or the determined type of data. In some examples, the machine-readable instructions 304 may include adjusting data communication to accommodate data communication bandwidth based, at least in part, on one of the determined type of network or the determined type of data. In some examples, the machine-readable instructions 304 may include determining a data limit associated with the mobile device. In some examples, the machine-readable instructions 304 may include rejecting the received request for data communication based, at least in part, on one of the determined type of network or the determined type of data.

In some implementations, signal bearing medium 302 may encompass a computer-readable medium 306, such as, but not limited to, a hard disk drive, a Compact Disc (CD), a Digital Versatile Disk (DVD), a digital tape, memory, etc. In some implementations, the signal bearing medium 302 may encompass a recordable medium 308, such as, but not limited to, memory, read/write (R/W) CDs, R/W DVDs, etc. In some implementations, the signal bearing medium 302 may encompass a communications medium 310, such as, but not limited to, a digital and/or an analog communication medium (e.g., a fiber optic cable, a waveguide, a wired communication link, a wireless communication link, etc.). In some examples, the signal bearing medium 302 may encompass a machine readable non-transitory medium.

In general, the method described with respect to FIG. 2 and elsewhere herein may be implemented in any suitable server and/or computing system. Example systems may be described with respect to FIG. 4 and elsewhere herein. In general, the computer system may be configured to selectively synchronize data.

Figure 4:
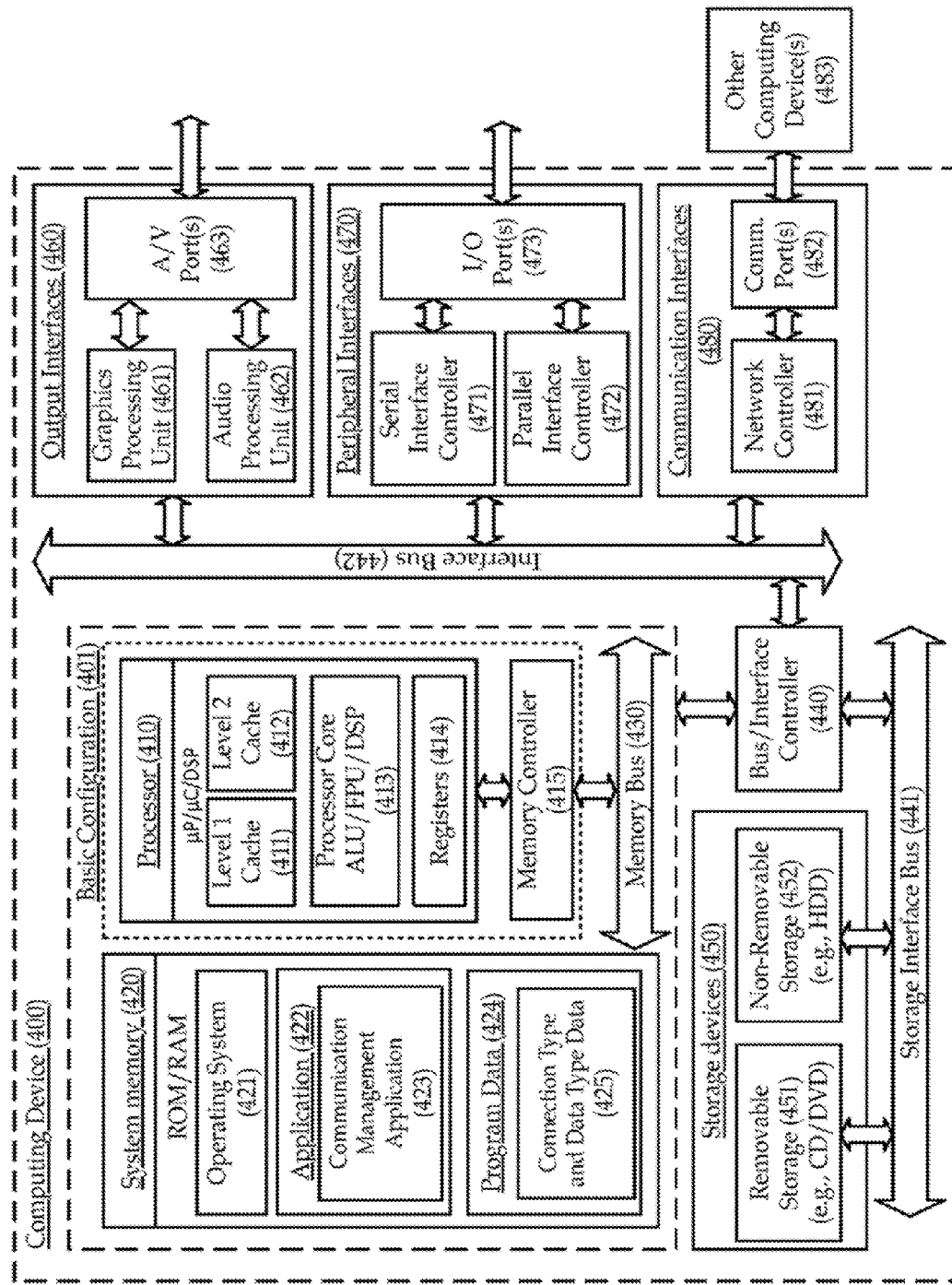
FIG. 4 illustrates a block diagram of an example computing device, all arranged in accordance with at least some embodiments of the present disclosure.

FIG. 4 is a block diagram illustrating an example computing device 400, arranged in accordance with at least some embodiments of the present disclosure. In various examples, the computing device 400 may be configured to manage data communication as discussed herein. In various examples, the computing device 400 may be configured to selectively synchronize data with a tethered device as discussed herein. In one example of a basic configuration 401, the computing device 400 may include one or more processors 410 and a system memory 420. A memory bus 430 can be used for communicating between the one or more processors 410 and the system memory 420.

Depending on the desired configuration, the one or more processors 410 may be of any type including but not limited to a microprocessor (µP), a microcontroller (µC), a digital signal processor (DSP), or any combination thereof. The one or more processors 410 may include one or more levels of caching, such as a level one cache 411 and a level two cache 412, a processor core 413, and registers 414. The processor core 413 can include an arithmetic logic unit (ALU), a floating point unit (FPU), a digital signal processing core (DSP Core), or any combination thereof. A memory controller 415 can also be used with the one or more processors 410, or in some implementations the memory controller 415 can be an internal part of the processor 410.

Depending on the desired configuration, the system memory 420 may be of any type including but not limited to volatile memory (such as RAM), non-volatile memory (such as ROM, flash memory, etc.) or any combination thereof. The system memory 420 may include an operating system 421, one or more applications 422, and program data 424. The one or more applications 422 may include a data communication management application 423 that can be arranged to perform the functions, actions, and/or operations as described herein including the functional blocks, actions, and/or operations described herein. The program data 424 may include connection type and data type data 425 for use with the communication management application 423. In some example embodiments, the one or more applications 422 may be arranged to operate with the program data 424 on the operating system 421. This described basic configuration 401 is illustrated in FIG. 4 by those components within dashed line.

The computing device 400 may have additional features or functionality, and additional interfaces to facilitate communications between the basic configuration 401 and any required devices and interfaces. For example, a bus/interface controller 440 may be used to facilitate communications between the basic configuration 401 and one or more data storage devices 450 via a storage interface bus 441. The one or more data storage devices 450 may be removable storage devices 451, non-removable storage devices 452, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 420, the removable storage 451 and the non-removable storage 452 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 442 for facilitating communication from various interface devices (e.g., output interfaces, peripheral interfaces, and communication interfaces) to the basic configuration 401 via the bus/interface controller 440. Example output interfaces 460 may include a graphics processing unit 461 and an audio processing unit 462, which may be configured to communicate to various external devices such as a display or speakers via one or more NV ports 463. Example peripheral interfaces 470 may include a serial interface controller 471 or a parallel interface controller 472, which may be configured to communicate with external devices such as input devices (e.g., keyboard, mouse, pen, voice input device, touch input device, etc.) or other peripheral devices (e.g., printer, scanner, etc.) via one or more I/O ports 473. An example communication interface 480 includes a network controller 481, which may be arranged to facilitate communications with one or more other computing devices 483 over a network communication via one or more communication ports 482. A communication connection is one example of a communication media. The communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

The computing device 400 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. The computing device 400 may also be implemented as a personal computer including both laptop computer and non-laptop computer configurations. In addition, the computing device 400 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a signal bearing medium, a storage medium and/or storage media. This storage media, such as CD-ROMs, computer disks, flash memory, or the like, for example, may have instructions stored thereon, that, when executed by a computing device, such as a computing system, computing platform, or other system, for example, may result in execution of a processor in accordance with the claimed subject matter, such as one of the implementations previously described, for example. As one possibility, a computing device may include one or more processing units or processors, one or more input/output devices, such as a display, a keyboard and/or a mouse, and one or more memories, such as static random access memory, dynamic random access memory, flash memory, and/or a hard drive.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation;

or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to subject matter containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations.

While certain exemplary techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed is:

1. A processor-based method to synchronize data between a client device and a cloud-based service provider device, the method comprising:
   receiving, by the cloud-based service provider device, a request from the client device to synchronize data on the client device with data on the cloud-based service provider device, wherein the request is routed through a mobile device which is separate from the client device;
   determining, by the cloud-based service provider device, a type of network which provides a communication connection between the cloud-based service provider device and the mobile device based on an internet protocol (IP) address associated with the client device, a service set identifier (SSID) associated with the mobile device, wherein the SSID associated with the mobile device includes particular keywords to determine the type of network which provides the communication between the cloud-based service provider device and the mobile device, and a data speed associated with the network which provides the communication between the cloud-based service provider device and the mobile device, wherein the particular keywords comprise words identifying a brand of the mobile device, a brand of the mobile device operating system, and/or a standard type of the network;
   determining, by the cloud-based service provider device, a type of data to be synchronized between the cloud-based service provider device and the client device; and
   synchronizing the data between the cloud-based service provider device and the client device, by the cloud-based service provider device, based, at least in part, on the determined type of network which provides the connection between the cloud-based service provider device and the mobile device and the determined type of data to be synchronized between the cloud-based service provider device and the client device, wherein in response to a determination that the type of data comprises a video file, modifying a bit rate of the requested video file based on the type of network which provides the connection between the cloud-based service provider device and the mobile device.

2. The method of claim 1, further comprising:
   in response to a determination, by the cloud-based service provider device, that the type of network which provides the communication connection between the cloud-based service provider device and the mobile device comprises a wired network or a wireless local area network (WiFi), synchronizing the data between the cloud-based service provider device and the client device automatically.

3. The method of claim 1, further comprising determining a data limit associated with the communication connection between the mobile device and the cloud-based service provider device, and using the data limit to accept or reject the request.

4. The method of claim 1, father comprising:
   determining that the network is a cellular network;
   determining a file size of the data to be communicated; and
   rejecting the received request for data communication based, at least in part, on the file size exceeding the data limit.

5. A machine-readable non-transitory medium having stored therein instructions that, when executed by one or more processors, operatively enable a data communication manager of a cloud-based service provider to synchronize data between a client device and the cloud-based service provider device by performing operations comprising:
   receiving, by the cloud-based service provider device, a request from the client device to synchronize data on the client device with data on the cloud-based service provider device, wherein the request is routed through a mobile device which is separate from the client device;
   determining, by the cloud-based service provider device, a type of network which provides a communication connection between the cloud-based service provider device and the mobile device based on an internet protocol (IP) address associated with the client device, a service set identifier (SSID) associated with the mobile device, wherein the SSID associated with the mobile device includes particular keywords to determine the type of network which provides the communication between the cloud-based service provider device and the mobile device, and a data speed associated with the network which provides the communication between the cloud-based service provider device and the mobile device, wherein the particular keywords comprise words identifying a brand of the mobile device, a brand of the mobile device operating system, and/or a standard type of the network;
   determining, by the cloud-based service provider device, a type of data to be synchronized between the cloud-based service provider device and the client device; and synchronizing the data between the cloud-based service provider device and the client device, by the cloud-based service provider device, based, at least in part, on the determined type of network which provides the connection between the cloud-based service provider device and the mobile device and the determined type of data to be synchronized between the cloud-based service provider device and the client device, wherein in response to a determination that the type of data comprises a video file, modifying a bit rate of the requested video file based on the type of network which provides the connection between the cloud-based service provider device and the mobile device.

6. The machine-readable non-transitory medium of claim 5, wherein the instructions further comprise:
in response to a determination, by the cloud-based service provider device, that the type of network which provides the communication connection between the cloud-based service provider device and the mobile device comprises a wired network or a wireless local area network (WiFi), synchronizing the data between the cloud-based service provider device and the client device automatically.

7. The machine-readable non-transitory medium of claim 5, wherein the instructions further comprise determining a data limit associated with the communication connection between the mobile device and the cloud-based service provider device, and using the data limit to accept or reject the request.

8. The machine-readable non-transitory medium of claim 5, wherein the instructions further comprise:
determining that the network is a cellular network;
determining a file size of the data to be communicated; and
rejecting the received request for data communication based, at least in part, on the file size exceeding the data limit.

9. A system to synchronize data between a client device and a cloud-based service provider device, comprising:
a processor;
a data communication manager communicatively coupled to the processor; and
a machine-readable non-transitory medium having stored therein instructions that, when executed by the processor, operatively enable the data communication manager to perform operations comprising:
receiving, by the cloud-based service provider device, a request for data communication from the client device to synchronize data on the client device with data on the cloud-based service provider device, wherein the request is routed through a mobile device which is separate from the client device;
determining, by the cloud-based service provider device, a type of network which provides a communication connection between the cloud-based service provider device and the mobile device based on an internet protocol (IP) address associated with the client device, a service set identifier (SSID) associated with the mobile device, wherein the SSID associated with the mobile device includes particular keywords to determine the type of network which provides the communication between the cloud-based service provider device and the mobile device, and a data speed associated with the network which provides the communication between the cloud-based service provider device and the mobile device, wherein the particular keywords comprise words identifying a brand of the mobile device, a brand of the mobile device operating system, and/or a standard type of the network;
determining, by the cloud-based service provider device, a type of data to be synchronized between the cloud-based service provider device and the client device; and
synchronizing the data between the cloud-based service provider device and the client device, by the cloud-based service provider device, based, at least in part, on the determined type of network which provides the connection between the cloud-based service provider device and the mobile device and the determined type of data to be synchronized between the cloud-based service provider device and the client device, wherein in response to a determination that the type of data comprises a video file, modifying a bit rate of the requested video file based on the type of network which provides the connection between the cloud-based service provider device and the mobile device.

10. The system of claim 9, wherein the data communication manager is further configured to:
in, response to determination, by the cloud-based service provider device, that the type of network which provides the communication connection between the cloud-based service provider device and the mobile device comprises a wired network or a wireless local area network (WiFi), synchronize the data between the cloud-based service provider device and the client device automatically.

11. The system of claim 9, wherein the data communication manager is further configured to determine a data limit associated with the communication connection between the mobile device and the cloud-based service provider device, and use the data limit to accept or reject the request.

12. The system of claim 9, wherein the data communication manager is further configured to:
determine that the network is a cellular network;
determine a file size of the data to be communicated; and
reject the received request for data communication based, at least in part, on the file size exceeding the data limit.

13. The method of claim 1, wherein the request from the client device to synchronize data on the client device with data on the cloud-based service provider device comprises a request for two-way data communication.

* * * * *

UNITED STATES PATENT AND TRADEMARK OFFICE
CERTIFICATE OF CORRECTION

PATENT NO. : 9,462,502 B2  
APPLICATION NO. : 13/825096  
DATED : October 4, 2016  
INVENTOR(S) : Kim et al.

Page 1 of 1

It is certified that error appears in the above-identified patent and that said Letters Patent is hereby corrected as shown below:

In the Specification

In Column 1, Line 9, delete "§371" and insert -- § 371 --, therefor.

In Column 11, Line 30, delete "NV ports 463." and insert -- A/V ports 463. --, therefor.

In the Claims

In Column 16, Line 29, in Claim 4, delete "father" and insert -- further --, therefor.

In Column 18, Line 34, in Claim 10, delete "in, response to determination," and insert -- in response to a determination, --, therefor.

Signed and Sealed this  
Seventh Day of February, 2017

Michelle K. Lee  
*Director of the United States Patent and Trademark Office*